Sept. 28, 1965 H. B. COLLINS, JR., ETAL 3,209,258

RADIO COMMUNICATION SYSTEM

Filed May 22, 1961 2 Sheets-Sheet 1

INVENTORS
HAROLD B. COLLINS, JR.
ORVIL R. JONES
ALWIN G. STEINMAYER, JR.
BY
Henry W. Kaufmann
AGENT INVENTORS.
HAROLD B. COLLINS, JR.
ORVIL R. JONES
ALWIN G. STEINMAYER, JR.
BY Henry W. Kaufmann
AGENT United States Patent Office 3,209,258
Patented Sept. 28, 1965

3,209,258

RADIO COMMUNICATION SYSTEM

Harold B. Collins, Jr., Wayne, and Alwin G. Steinmayer, Jr., and Orvil R. Jones, Berwyn, Pa., assignors to General Electric Company, a corporation of New York Filed May 22, 1961, Ser. No. 111,747
3 Claims. (Cl. 325—3)

Figure 1:
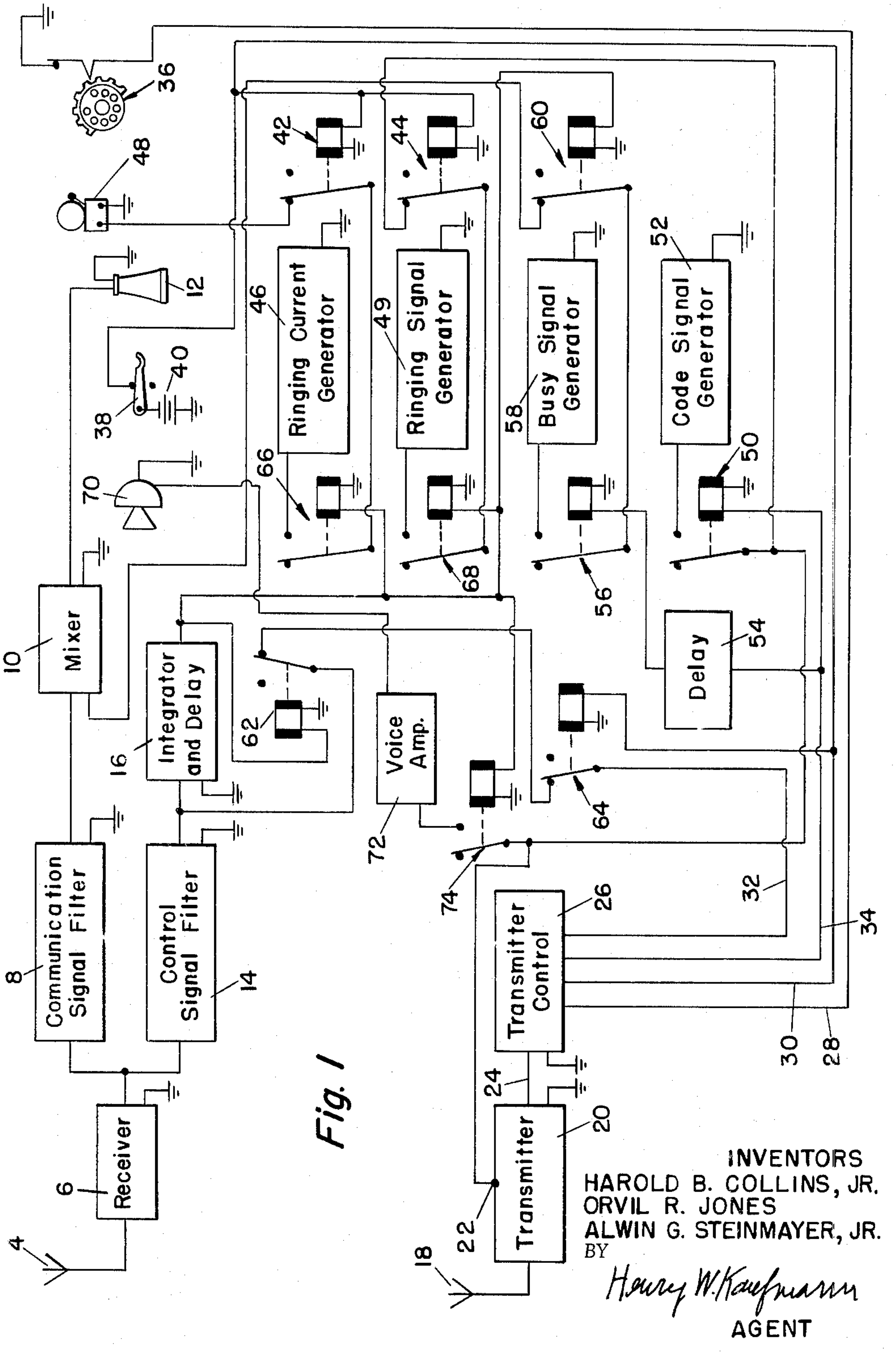

This invention pertains to the art of radio communication, and more particularly to means and process of operation for establishing communication between a plurality of stations via a repeating or relaying station.

There is known the practice of relaying radio communications by receiving, by a relay receiver, a signal to be relayed, and applying the signal or information content of the received signal to a relay transmitter, and retransmitting the signal or information content thereof by the relay transmitter. In various instances such an embodiment may be known as a repeater, or an automatic relay station, or simply as a booster or repeater. Such devices are particularly useful at so-called quasi-optical frequencies which undergo substantially line-of-sight propagation; intermittently serviced highly reliable repeaters located high upon the hilltops may, for example, replace telephone lines across rocky mountains, with a considerable increase in reliability under severe weather conditions such as sleet. Because the modern telephone era employs carrier communication with great freedom, these repeater facilities are in practice usually broad-banded multiple-channel devices. As replacements of fixed-line facilities, they have, not unnaturally, been designed and installed to receive signals from a transmitter located in a first particular direction and to retransmit them in a second particular direction.

In other words, they tie together with a multiplicity of fixed channels, two different primary stations. These primary stations ordinarily serve to concentrate communication channels or lines in their vicinity; a call from such a given line travels to its primary station, where the call is routed to a particular one of the channels available to communicate to the relay station. The relay station automatically routes the call to the corresponding channel at the second primary station, and from there it is routed to the called line. Thus, if the relay-served route between primary station A and primary station B has twenty channels, a given local line is plugged into (let us say) channel 17 at primary station A, and the call (after transmission through the relay) comes out of the channel marked "17" at primary station B. Operationally, the radio-relay link is used as though it were simply a multiple-pair telephone cable in which the green wire with the purple stripe at one end of the cable is electrically connected to the green wire with the purple stripe at the other end of the cable.

But radio communication was first exploited for its freedom of making and breaking communication links with different stations. If a given station was known to maintain its watch on a particular frequency, a calling station could tune its transmitter to that frequency and call. The called station could reply on its own receiving frequency; or, if it were equipped for rapid frequency changing, it could shift to the known receiving frequency of the calling station and reply on that frequency. Even today, it is common to hear shore stations calling a long list of ship stations for which they have traffic, and finishing with "Reply XXXX kc.," where XXXX specifies the receiving frequency of the calling station.

The technical feasibility of putting in long-lived orbit around the earth satellites bearing electronic equipment capable of unattended operation and powered by converters to electricity of the energy of solar radiation has produced many serious proposals for the injection into orbit of satellite-borne radio relay stations. These have inter alia the virtue of returning to earth at distant points signals whose frequency is so high that they pierce the Kennelly-Heaviside layer without any substantial reflection back to earth. The relay satellites thus can make available for long-distance communication signals of frequencies which ordinarily are useful only over so-called quasi-optical paths.

The shortage of comparatively low-frequency radio channels (which bend or are reflected around the earth by the Kennelly-Heaviside layer) renders the possible long-distance use of the far more numerous higher frequency channels of great importance. However, even though the higher frequencies contain more channels of given width, these channels are not unlimited in number; and, even more important, while channels in the ether itself may be free natural resources, a channel in a satellite-borne relay station is by no means obtained gratis. Even if, for example, a relay station is installed on a mountain top to provide intercommunication among a fleet of taxicabs or service trucks which operate in separated valleys (or in streets hedged by high buildings), it is not feasible to provide each primary station with a separate clear channel to every other station. The way that this problem has been solved in ordinary mobile telephone service, for example, is to provide switching facilities at a central exchange; but the weight limitations and the requirement for reliability such as to create a very high probability of operation for periods of the order of hundreds of thousands of hours render it currently impossible to provide economical central switching in a satellite-borne repeater, and uneconomical in many types of terrestrial repeater. However, the same restrictions render it extremely wasteful to provide channels connecting every primary station with every other primary station; the minimum number of channels to do this is the number of combinations of the total number $n$ of primary stations taken two at a time, which is $n(n-1)/2$, and increases very rapidly with $n$.

Our invention teaches the use of a single channel for transmission to a given primary station from any other of a plurality of primary stations, with provisions for preventing a calling station from interfering with communication already established by some other primary station. Thus the required number of channels is proportional only to the total number of primary stations. If certain primary stations are to have several channels for simultaneous operation, this is much the same as though a corresponding number of primary stations were to be located on the same spot.

Briefly, each primary station transmitter is designed to be readily automatically tuned to the assigned relay input frequency of the channel of any other primary station with which it may be intended to communicate. (In general, a relay will receive a given signal channel on one frequency and relay or retransmit it on another frequency. Thus the primary or ground transmitter which is to send a signal into the relay will cause it to enter the relay at the relay input frequency for the chosen channel, and the receiver to which the signal is ultimately addressed will be tuned to receive a signal transmitter by the relay at the relay output frequency corresponding to the same chosen channel.)

According to our invention, we provide means for operating a ground or primary station in connection with a telephone which is operative very similarly, so far as the user is concerned, to an ordinary wire-line telephone. The dial switch is used to identify the station to be called, and the transmitter is tuned to the relay input frequency corresponding to the relay output frequency to which the receiver of the called station is tuned. (In this system, the receiver frequency is the characteristic assigned station frequency, to which the receiver is permanently tuned while the frequency assignment endures.) After the transmitter has been tuned, power is applied to it and a coded control signal identifying the receiver channel of the calling station is transmitted. This control signal is at a frequency outside of the communication signal band. This is quite essential because it can be received at the called receiver even though the called receiver may be in use in conversation with another station at the time. It is a peculiarity of the relay system that it is not compatible with maximum simplicity to provide indication in the relay or repeater that a given channel is in use, and to employ such indication to lock out other callers. To avoid interference with a call in progress, the ordinary communication input—the telephone transmitter, for example—is cut out during the calling period. If the called station is not in use, its receiver will repeat the coded control signal through the system to cause the transmitter of the called station to tune to the frequency corresponding to the relay input for the calling station's receiving channel. This control signal will also initiate ringing of the bell (or ringer) of the telephone connected to the called station, and will feed the modulator of the called station's transmitter with a ringing signal, which will be fed back to the called station's receiver (via relay) as an indication that electrical communication with the called station has been established. If the called station's telephone is now answered in the conventional manner, the closing of its hook switch will stop the ringing current and the ringing signal. At the calling station, the receipt of the signal from the called station permits the communication channel—the telephone transmitter—to modulate the radio transmitter. Provision is made to prevent any interfering signal from tuning the transmitter of a called station; this is done by arranging that either the closing of the hook switch contacts or the long continuation of an incoming received signal will inhibit the automatic transmitter tuning circuit. This creates the problem of indicating to the caller that he is not succeeding in establishing communication. Since no channel is available to return this information from the called, busy station, a time delay is provided so that the caller at the calling station receives a locally generated "busy" signal if no replying signal is received after a certain brief time has elapsed from the initial call; this is really a failure signal, since either busyness or called station failure will produce it.

Thus our invention provides a service which simulates in operating characteristics, so far as the user is concerned, a conventional wire-line or point-to-point repeater system with centralized switching, when our invention is actually used with a simple multiple-channel relay. Since our invention places no particular requirements on the relay, it is possible to use some relay channels for communication by our invention, and to use other similar channels as permanent links between stations having permanent frequency assignments to these latter channels. Spare channels in the repeater may be assigned to either type of use; and, indeed, as satellite-borne repeaters move over different parts of the earth, given channels may be differently used, depending upon the ground station installations in the regions over which they pass.

Figure 2:
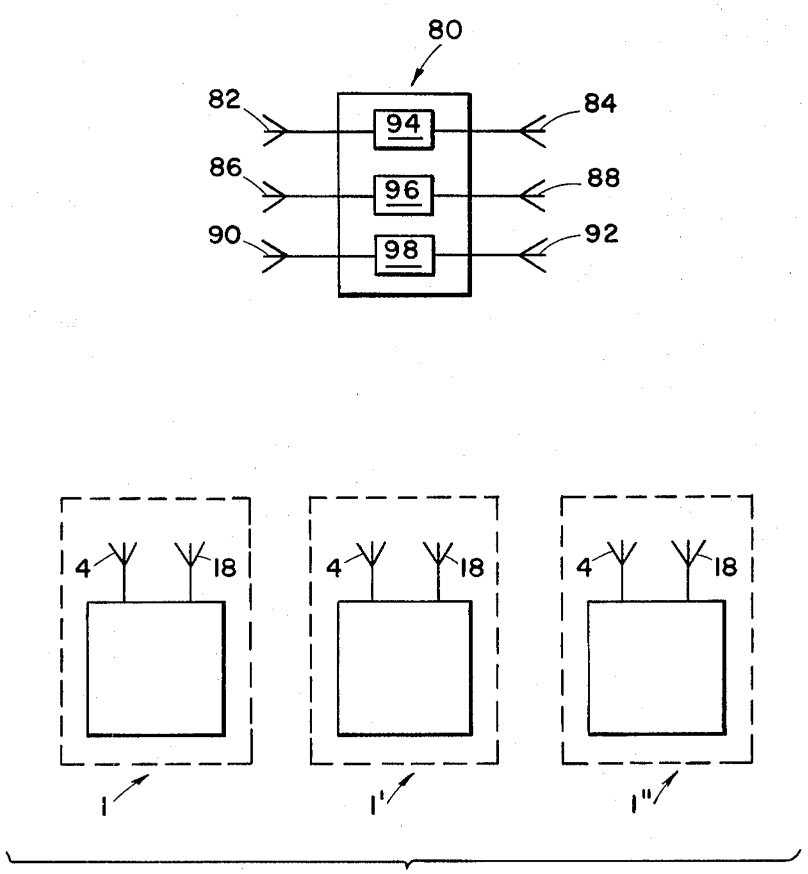

For the better understanding and explanation of our invention we have provided figures of drawing in which:

FIG. 1 represents schematically a ground station for use according to our invention; and FIG. 2 represents a relay system according to our invention.

In FIG. 1, receiving antenna 4 feeds receiver 6, whose detected output is fed to two filters, of which 8, the communication signal filter, passes to an input of mixer 10 the message-bearing components of the signal; for ordinary telephony, as represented, these may be the frequency components from perhaps 300 to a few thousand cycles, depending upon the quality desired. The output of mixer 10 is fed to telephone receiver 12. Another filter 14, the control signal filter, passes the control signal frequency band to integrator and delay 16. The control frequencies may conveniently be below the communication signal filter pass band, since no great operating speeds are required which would necessitate great band width for control signals; operation with the control signals above the communication signal frequencies is, however, equally possible. The integrator and delay 16 serves to delay, and to insure a continuity of signal even during transient interruptions in the control signal. The control signal thus modified is applied to a number of control purposes which may best be understood if the transmitting equipment is first described.

Transmitting antenna 18 is connected to transmitter 20, which has a modulator input terminal 22 and a control line 24 which connects it to transmitter control unit 26. Transmitter control unit 26 has three input lines 28, 30, and 32, and an output line 34, the use of whose functions will be described in detail hereinafter. Briefly, for the present, line 28 receives coded signals which may be impulses from a telephone dial switch 36, and, responsively thereto, causes control unit 26 to tune transmitter 20 to a frequency designated by the coded signals. Line 30 is connected to hook switch 38, whose contact is represented for convenience as powered by a battery 40, so that, when the hook switch is closed, the transmitter control 26 is caused to apply power to itself and to the power supply of transmitter 20. Closing of hook switch 38 also opens normally closed relays 42 and 44, opening the output circuits from ringing current generator 46 to bell 48, and from ringing signal generator 49 to modulator input terminal 22 of tranmsitter 20. Thus, when the hook switch 38 is closed, it is impossible for the bell 48 to be rung or for ringing signal to be applied to modulate the transmitter.

Line 34 receives an output from transmitter control 26 after the tuning of the transmitter 20 in response to signals on line 28 has been accomplished and the transmitter has been turned on. The output on line 34 closes relay 50 and thus applies the output of code signal generator 52 to modulator terminal 22 of transmitter 20. It also actuates delay device 54 which, after the lapse of its delay period (which may be of the order of a fraction of a second or more, depending upon the speed of operation to be expected of the system) closes relay 56, thus applying the output of busy signal generator 58 through normally closed relay 60 to the second input of mixer 10, causing a busy signal to be heard in telephone 12.

Line 32 is a remote turn-on and control connection. It is fed directly from the output of control signal filter 14 via normally closed relay 62 and normally closed relay 64. A signal appearing upon line 32 must necessarily have been received over receiver 6. In accordance with the mode of operation of the system, a signal thus received and passed by control signal filter 14 should be a signal from a calling station, having encoded in its signals representing the frequency to which transmitter 20 must be tuned to be received by the receiver of the calling station. Thus a signal on line 32 must energize the transmitter system similarly to a signal from hook switch 38 on line 30, and must also cause transmitter 20 to be tuned by transmitter control 26 similarly to a coded signal on line 28 from dial switch 36. However, it is not desired that the signal for this function be continued longer than required to tune the transmitter, so after the output of integrator and delay 16 has built up to normal value, it opens relay 62; likewise, if the system is already in use, it is not desired that an interfering signal retune the transmitter; so the output of hook switch 38 is connected to open relay 64 when hook switch 38 is closed. The output of integrator and delay 16 operates to close relay 66, thus applying the output of ringing current generator 46 through relay 42 (if hook switch 38 is open) to bell 48. (Lifting of the load on hook switch 38 causes relay 42 to cut off ringing current, consistently with ordinary telephone practice.) The output of 16 also closes relay 68, applying the output of ringing signal generator 49 through relay 44 (if hook switch 38 is open) to modulator terminal 22 of transmitter 20. Thus when ringing current is being applied to bell 48 as a result of receipt of control signals over receiver 6 and through filter 14, a ringing signal is applied to the modulator so that the ringing signal is transmitted back to the calling station. If hook switch 38 is closed, neither of these events occurs. Then at the calling station (which is assumed to be identical with that here represented), the signal on line 34 will, after a suitable delay (through delay unit 54) close relay 56, tying the output of busy signal generator 58 through relay 60 to the second input of mixer 10, producing an audible busy signal in receiver 12. Relay 60, being fed from the output of integrator and delay 16, will open the busy signal circuit if a reply has been received on receiver 6 and through control signal filter 14.

One final function of the output of integrator and delay 16 remains to be described. A microphone 70 is represented as connected to voice amplifier 72, whose output is connected through normally open relay 74 to modulator terminal 22 of transmitter 20. An output from integrator and delay 16 will close relay 74, permitting microphone 70 to modulate the output of transmitter 20. Thus no speech communication is possible unless a signal is being received on receiver 6. This has the advantage that a calling station cannot transmit communication signals to a busy station whose transmitter is tuned to the channel of a third station and locked out from the frequency of the calling station. It is clear that, to achieve these results, control signal must be produced continually at all times when transmitter 20 is operative. This is easily achieved by standard methods; and, since control signals are not in the communication signal frequency range, causes no interference.

In accordance with our purpose and intent, the complex and unusual aspects of our invention appear physically embodied primarily in the primary stations, according to the representation of FIG. 1. The employment of such a primary station in connection with a conventional form of repeater or relay station is straightforward, as may be seen by reference to FIG. 2.

FIG. 2 represents a system according to our invention employing primary stations as represented in FIG. 1.

The rectangles marked off with dashed lines, represented as bearing antennas 4 and 18, and generically marked with references 1, 1', and 1'', respectively, are primary stations in accordance with FIG. 1, the many details of FIG. 1 being omitted in FIG. 2 for simplicity and to conserve space. The rectangle identified by reference mark 80 is a schematic representation of a repeater or relay adapted for use in a system according to our invention. The antenna symbol marked 82 symbolizes an input channel connected, as represented by a line, to an antenna symbol marked 84, which symbolizes an output channel. Similarly input channel 86 is connected to output channel 88, and input channel 90 is connected to output channel 92. Inserted in the connection between input channel 82 and output channel 84, there is a rectangle 94 symbolically representative of the electronic equipment connecting the input channel of the relay with the ouput channel. Such equipment may be any one of a number of kinds well-known in the art. It may conveniently comprise a device for receiving signals of a particular frequency and altering their mean frequency as is accomplished by the well-known supersonic heterodyne method known to the art since the time of World War I. Such a method and device may be employed to displace the frequency of the received signal and the thus displaced signal may then be amplified at its new frequency for transmission from output channel 84. Alternatively, rectangle 94 may comprise a receiver of any kind adapted to receive a signal coming in on input channel 82, and to demodulate this to recover a signal representative of the information content, and then apply this signal to modulate a transmitter operating at the frequency desired for the signal to be transmitted via output channel 84. The connection between input channel 86 and output channel 88 similarly passes through a rectangle marked with reference number 96, and the connection from input channel 90 to output channel 92 passes through a rectangle marked with reference number 98. It is, of course, apparent to those skilled in the art, and particularly to those knowledgeable in the field of so-called carrier-current communications, that a vast mass of techniques exist for performing the functions ascribed to rectangles 94, 96, and 98, the more sophisticated of which would combine these rectangles in a single multiple-channel device; but such combination would not alter the unique one-to-one connection of a given input channel with a given output channel.

It is thus evident that a relay such as has been described or defined is required to perform only simple receiving and transmitting functions, without the necessity of any internal selections, or alterations in the connections between the various input channels and the various output channels. It is further apparent that the function of the device described is purely that of relaying, as its name indicates, and that, apart from the differences in the signal characteristics or carrier frequency before and after their relaying, and the benefits of improved propagation via the relay, communication between primary stations such as 1 and 1' might otherwise be conducted with no major alterations in the functioning of the system.

Thus it is evident that we have provided means whereby communication essentially similar in service to the user to conventional wire-line or other fixed-point communication systems employing centralized switching may be provided utilizing repeaters having no switching facilities, and requiring only one channel per station to be served. The repeater or relay itself may provide this multiplicity of channels either by the use of broad-band receivers feeding broad-band transmitters, or single-channel receivers feeding single-channel transmitters, or any combination of these; and the use of some of the repeater channels for the purposes of our invention does not preclude their use at any other time for more conventional repeater applications.

The particular apparatus and connections represented in FIG. 1 are but a single example of the embodiment of the basic principles we teach. What we claim is:

1. A relay communication system comprising: at least one multiple-channel relay whose equipment comprises a plurality of input channels and a plurality of output channels of which each said input channel is connected to one and only one said output channel and each said output channel is connected to one and only one said input channel; and a plurality of primary stations comprising a radio receiver permanently tuned to a said output channel of the said relay, a transmitter tunable in response to coded signals to a plurality of input channels of the said relay, means for thus tuning the said transmitter to a relay input channel associated with another station of the said plurality of primary stations, and for transmitting from the said transmitter on the said relay input channel a first coded control signal representative of the input channel which is connected in the said relay to the said output channel to which the said receiver is tuned; means for receiving second control signals from the said receiver for tuning the said transmitter to the channel represented by coding of the said second control signals, for initiating and maintaining operation of the said transmitter during the continuation of the said second control signals, for operating a local signal and for transmitting from the said transmitter a signal representative of the fact that the said local signal is in operation, and for preventing tuning of the said transmitter by any other coded signal during the continuation of the said second control signal.

2. A relay communication system comprising a plurality of primary stations and at least one relay having at least one input channel for each said primary station, at least one output channel connected to each one and only one of the said input channels to retransmit on a different frequency the information and control signal content of the signals received on the said input channel, each said primary station comprising a radio transmitter, means for tuning the said transmitter to the frequency of a selected one of the said input channels responsively to coded signals produced by the operation of a telephone dial switch, means for automatically placing the transmitter in operation at the completion of the said tuning and for transmitting during the operation of the transmitter a non-interfering first control signal and for coding the said first control signal with a code representative of the channel assigned to the said primary station; means for preventing the tuning of the transmitter by any other means during the continuation of the said operation; receiver means for receiving transmissions including a second control signal and for causing the said received second control signal to cause the said transmitter to be tuned to a channel represented by coding of the said received second control signal and to be placed in operation at the completion of the said tuning and to be maintained in operation during the continuation of reception of the said second control signal and to prevent the tuning of the said transmitter by any other means during the said continuation of reception of the said second control signal; delay means connected to busy signal means for operating a busy signal after the initiation of operation of the said transmitter after tuning responsively to signals produced by the said telephone dial switch; busy signal inhibit means responsive to a second control signal received by said receiver means to inhibit the operation of the said busy signal; connection means responsive to a second control signal received by said receiver means to connect a telephone transmitter circuit to the said transmitter.

3. A radio station comprising in combination:

a radio receiver adapted to receive intelligence communication signals and, simultaneously therewith, a first control signal;

a radio transmitter adapted to transmit intelligence communication signals and, simultaneously therewith, a continuous non-interfering second control signal;

means for modulating the said second control signal for transmission of a code;

means for receiving from the said receiver a first control signal modulated for transmission of a code;

means for, responsively to the coding of the said first control signal, tuning the transmitter to a channel represented by the said coding;

means for, responsively to the presence of the said first control signal, causing the operation of the transmitter and permitting the transmission of intelligence communication signals thereby; and means for, responsively to the absence of the said first control signal, preventing the transmission of intelligence communication signals by the transmitter even during the transmission thereby of second control signals.

References Cited by the Examiner

UNITED STATES PATENTS

| | | | |
|---|---|---|---|
| 2,383,908 | 8/45 | Bowers | 343—177 |
| 2,641,757 | 6/53 | Hoth et al. | 343—179 |
| 2,671,166 | 3/54 | O'Brien | 343—177 |
| 2,694,196 | 11/54 | Baker | 343—177 |
| 2,718,589 | 9/55 | Staples | 325—3 |
| 2,773,176 | 12/56 | Braak et al. | 325—25 |
| 2,851,591 | 9/58 | Braak | 343—177 |

DAVID G. REDINBAUGH, *Primary Examiner.*

GEORGE WESTBY, *Examiner.*